United States Patent
Ji et al.

(10) Patent No.: US 11,751,137 B2
(45) Date of Patent: *Sep. 5, 2023

(54) WIRELESS ACCESS POINT, TERMINAL DEVICE, AND METHOD FOR WAKING UP TERMINAL DEVICE BY WIRELESS ACCESS POINT

(71) Applicant: Huawei Technologies Co., Ltd., Shenzhen (CN)

(72) Inventors: Chenhe Ji, Nanjing (CN); Yan Zhuang, Nanjing (CN); Yungui Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

This patent is subject to a terminal disclaimer.

(21) Appl. No.: 17/480,456

(22) Filed: Sep. 21, 2021

(65) Prior Publication Data
US 2022/0007288 A1    Jan. 6, 2022

Related U.S. Application Data

(63) Continuation of application No. 16/665,270, filed on Oct. 28, 2019, now Pat. No. 11,153,823, which is a
(Continued)

(30) Foreign Application Priority Data

Apr. 26, 2017    (CN) .......................... 201710282884.8

(51) Int. Cl.
*H04W 52/02*    (2009.01)
*H04W 72/04*    (2023.01)
*H04W 72/044*    (2023.01)

(52) U.S. Cl.
CPC ... *H04W 52/0229* (2013.01); *H04W 52/0216* (2013.01); *H04W 72/044* (2013.01)

(58) Field of Classification Search
CPC ............. H04W 52/0229; H04W 84/12; H04W 72/044; H04W 52/028; H04W 88/08;
(Continued)

(56) References Cited

U.S. PATENT DOCUMENTS 5,194,860 A    3/1993  Jones et al.
10,015,741 B2  7/2018  Ramamurthy et al.
(Continued)

FOREIGN PATENT DOCUMENTS

CN    102300293 A    12/2011
CN    104796971 A    7/2015
(Continued)

OTHER PUBLICATIONS

Guo, J., et al., "Initial thoughts on High Level MAC procedures," IEEE 802.11-17/0354r0, Mar. 13, 2017, 16 pages.
(Continued)

*Primary Examiner* — Brian D Nguyen
(74) *Attorney, Agent, or Firm* — Conley Rose, P.C.

(57) ABSTRACT

A wireless access point, a terminal device, and a method for waking up a terminal device by a wireless access point. The terminal device includes a primary radio frequency circuit and a wake-up radio (WUR) radio frequency circuit. The WUR radio frequency circuit only receives a radio signal and operates on a specified channel. If the WUR radio frequency circuit receives a wake-up frame on the specified channel and the terminal device is a to-be-woken-up terminal device, the WUR radio frequency circuit wakes up the primary radio frequency circuit. The wake-up frame includes an identifier of the to-be-woken-up terminal device. The primary radio frequency circuit operates on an operating
(Continued)

channel of the primary radio frequency circuit after being woken up.

26 Claims, 4 Drawing Sheets

Related U.S. Application Data continuation of application No. PCT/CN2018/084581, filed on Apr. 26, 2018.

(58) Field of Classification Search
CPC ... H04W 88/02; H04W 52/0216; Y02D 30/70
See application file for complete search history.

(56) References Cited

U.S. PATENT DOCUMENTS

| | | | |
|---|---|---|---|
| 2006/0202804 A1* | 9/2006 | Vijay-Pillai | G06K 19/0705 340/10.33 |
| 2007/0250126 A1* | 10/2007 | Maile | A61N 1/37252 607/16 |
| 2010/0027449 A1 | 2/2010 | Kim et al. | |
| 2010/0165898 A1 | 7/2010 | Tang et al. | |
| 2011/0317600 A1 | 12/2011 | Thomson et al. | |
| 2012/0019285 A1* | 1/2012 | Mosalikanti | H03K 17/22 327/1 |
| 2012/0147996 A1* | 6/2012 | Liu | H04L 27/06 375/340 |
| 2014/0050133 A1 | 2/2014 | Jafarian et al. | |
| 2015/0334650 A1 | 11/2015 | Park | |
| 2016/0127995 A1 | 5/2016 | Merlin et al. | |
| 2016/0295512 A1 | 10/2016 | Hara et al. | |
| 2016/0374019 A1 | 12/2016 | Park et al. | |
| 2017/0111858 A1 | 4/2017 | Azizi et al. | |
| 2017/0332327 A1 | 11/2017 | Fang et al. | |
| 2018/0255515 A1 | 9/2018 | Gupta Hyde et al. | |
| 2018/0302854 A1 | 10/2018 | Ramamurthy et al. | |
| 2019/0394726 A1* | 12/2019 | Gan | H04W 88/08 |
| 2020/0015166 A1 | 1/2020 | Ahn et al. | |
| 2020/0043649 A1 | 2/2020 | Dietz et al. | |
| 2020/0053649 A1* | 2/2020 | Yao | H04W 76/28 |
| 2020/0146005 A1 | 5/2020 | Suh et al. | |
| 2020/0275366 A1 | 8/2020 | Dong | |
| 2020/0322770 A1 | 10/2020 | Lepp et al. | |
| 2020/0351778 A1 | 11/2020 | Knowles | |

FOREIGN PATENT DOCUMENTS

| | | |
|---|---|---|
| CN | 106131800 A | 11/2016 |
| CN | 107360619 A | 11/2017 |
| JP | 2011049721 A | 3/2011 |
| JP | 2015136113 A | 7/2015 |
| KR | 20160086590 A | 7/2016 |
| WO | 2015072053 A1 | 5/2015 |
| WO | 2017052596 A1 | 3/2017 |

OTHER PUBLICATIONS

Park, M., et al., "Proposal for Wake-Up Receiver (WUR) Study Group," IEEE 802.11-16/0722r1, May 18, 2016, 14 pages.
Yao, K., et al., "Demand on Roaming for WUR," IEEE 802.11-16/0931r0, Jul. 25, 2016, 9 pages.
Abouol-Magd, O., et al., "A CSD Proposal for Wake-up Radio (WUR)," IEEE 802.11-12/1077r04, Sep. 2016, 6 pages.
Azizi, S., et al., "A PAR Proposal for Wake-up Radio," IEEE 802.11-16/859r09, Jul. 28, 2016, 5 pages.
Kim, I., et al., "AP Discovery using WUR," IEEE 802.11-16/1501r0, Nov. 16, 2016, 11 pages.
Gan, M., et al., "Proposed 802.11ba Functional Requirements," IEEE 802.11-17/0039r2, Jan. 16, 2017, 3 pages.
Azizi, S., "IEEE 802.11 TGba Simulation Scenarios and Evaluation Methodology Document," IEEE 802.11-17/0188r04, Jan. 2017, 7 pages.

* cited by examiner

WIRELESS ACCESS POINT, TERMINAL DEVICE, AND METHOD FOR WAKING UP TERMINAL DEVICE BY WIRELESS ACCESS POINT

CROSS-REFERENCE TO RELATED APPLICATIONS

This application is a continuation of U.S. patent application Ser. No. 16/665,270, filed on Oct. 28, 2019, now U.S. Pat. No. 11,153,823, which is a continuation of International Patent Application No. PCT/CN2018/084581, filed on Apr. 26, 2018, which claims priority to Chinese Patent Application No. 201710282884.8, filed on Apr. 26, 2017. All of the aforementioned patent applications are hereby incorporated by reference in their entireties.

TECHNICAL FIELD

This application relates to the communications field, and in particular, to a wireless access point, a terminal device, and a method for waking up a terminal device by a wireless access point.

BACKGROUND

A terminal device in a wireless local area network (WLAN) may enter a sleep mode. However, the terminal device in the sleep mode also needs to frequently enter an awake state from a sleep state to receive data.

SUMMARY

This application provides a wireless access point, a terminal device, and a method for waking up a terminal device, in order to reduce power consumption of a terminal device.

According to a first aspect, a terminal device is provided. The terminal device includes a primary radio frequency circuit and a wake-up radio (WUR) radio frequency circuit. The WUR radio frequency circuit is configured to only receive a radio signal and operate on a specified channel. If the WUR radio frequency circuit receives a wake-up frame on the specified channel and the terminal device is a to-be-woken-up terminal device, the WUR radio frequency circuit is further configured to wake up the primary radio frequency circuit. The wake-up frame includes an identifier of the to-be-woken-up terminal device. The primary radio frequency circuit is configured to operate on an operating channel of the primary radio frequency circuit after being woken up.

The WUR radio frequency circuit is a radio frequency circuit other than the primary radio frequency circuit in the terminal device. The WUR radio frequency circuit can only receive a radio signal and cannot send a radio signal. The WUR radio frequency circuit is only configured to receive a frame (e.g., a WUR frame) related to a wake-up operation, and ignores other frames (for example, a WLAN data frame). Therefore, both power consumption and complexity of the WUR radio frequency circuit are relatively low. Power consumption of the WUR radio frequency circuit that is generated during operating may be less than 100 microwatts ($\mu W$). To wake up the terminal device in time, the WUR radio frequency circuit operates on the specified channel. The WUR radio frequency circuit does not need to frequently switch a channel. Because another WLAN device knows the specified channel, the other WLAN device can send a wake-up frame on the specified channel. When operating on the specified channel, the WUR radio frequency circuit can receive the wake-up frame, to wake up the primary radio frequency circuit.

With reference to the first aspect, in a first implementation of the first aspect, the primary radio frequency circuit is further configured to receive information about the specified channel of the WUR radio frequency circuit on the operating channel of the primary radio frequency circuit. If the specified channel is dynamically negotiated, or if the terminal device does not know the specified channel, a WLAN device may notify the terminal device of the specified channel.

With reference to the first aspect or the first implementation of the first aspect, in a second implementation of the first aspect, an operating band of the primary radio frequency circuit is the same as an operating band of the WUR radio frequency circuit.

With reference to the first aspect, the first implementation of the first aspect, or the second implementation of the first aspect, in a third implementation of the first aspect, an operating channel available to the primary radio frequency circuit is a WLAN channel other than the specified channel. Because the operating channel and the specified channel are different, inter-channel interference can be reduced.

With reference to any one of the first aspect, or the first implementation to the third implementation of the first aspect, in a fourth implementation of the first aspect, the wake-up frame further includes an indication for the operating channel, and the primary radio frequency circuit is configured such that after being woken up, the primary radio frequency circuit operates on the operating channel indicated by the wake-up frame. The wake-up frame indicates an operating channel of the WLAN device on which the wake-up frame is sent, such that burden of the primary radio frequency circuit in scanning a channel after the primary radio frequency circuit is woken up can be alleviated.

With reference to any one of the first aspect, or the first implementation to the fourth implementation of the first aspect, in a fifth implementation of the first aspect, the identifier of the to-be-woken-up terminal device is an individual identifier of the terminal device, and the primary radio frequency circuit is further configured such that after being woken up, the primary radio frequency circuit sends a response to the wake-up frame on the operating channel indicated by the wake-up frame. The terminal device responds to the wake-up frame, to notify the WLAN device that the terminal device has been woken up. Because the WUR radio frequency circuit cannot send a radio signal, the primary radio frequency circuit of the terminal device sends the response to the wake-up frame on the operating channel after being woken up.

With reference to any one of the first aspect, or the first implementation to the fifth implementation of the first aspect, in a sixth implementation of the first aspect, the WUR radio frequency circuit is further configured to: receive a WUR beacon frame; and if the WUR beacon frame indicates a new specified channel, operate on the new specified channel. If a specified channel of the WLAN device is dynamic, the WLAN device may change the specified channel. To enable the terminal device to know a change of the specified channel, the WLAN device notifies the terminal device of the new specified channel.

According to a second aspect, a method for waking up a terminal device is provided. The method includes the steps performed by the terminal device in the first aspect.

According to a third aspect, a method for waking up a terminal device is provided. The method includes: sending, by a WLAN device, a wake-up frame on a specified channel, where the wake-up frame includes an identifier of a to-be-woken-up terminal device; and sending, by the WLAN device, a WLAN frame on an operating channel.

With reference to the third aspect, in a first implementation of the third aspect, the method further includes sending, by the WLAN device, information about the specified channel on the operating channel.

With reference to the third aspect or the first implementation of the third aspect, in a second implementation of the third aspect, an operating channel available to the WLAN device is a WLAN channel other than the specified channel.

With reference to the third aspect, the first implementation of the third aspect, or the second implementation of the third aspect, in a third implementation of the third aspect, the wake-up frame further includes an indication for the operating channel.

With reference to any one of the third aspect, or the first implementation to the third implementation of the third aspect, in a fourth implementation of the third aspect, the identifier of the to-be-woken-up terminal device is an identifier of one terminal device. Additionally, the method further includes: if the WLAN device receives no response to the wake-up frame on the operating channel, sending, by the WLAN device, a new wake-up frame on the specified channel.

With reference to any one of the third aspect, or the first implementation to the fourth implementation of the third aspect, in a fifth implementation of the third aspect, the identifier of the to-be-woken-up terminal device is a group identifier or a broadcast identifier, the WLAN frame is a group addressed frame, and the WLAN device sends the WLAN frame on the operating channel after a preparation period after the wake-up frame is sent. If the WLAN device sends the wake-up frame indicating that the identifier is a group identifier or a broadcast identifier, to wake up a plurality of terminal devices, the WLAN device does not need to determine whether each terminal device has been woken up.

With reference to any one of the third aspect, or the first implementation to the fifth implementation of the third aspect, in a sixth implementation of the third aspect, the method further includes periodically sending, by the WLAN device, a wake-up radio (WUR) beacon frame on the specified channel, where the WUR beacon frame and a beacon frame on the operating channel are separately sent.

With reference to the sixth implementation of the third aspect, in a seventh implementation of the third aspect, the WUR beacon frame includes an indication for the operating channel.

With reference to any one of the third aspect, or the first implementation to the seventh implementation of the third aspect, in an eighth implementation of the third aspect, the method further includes: before changing the specified channel, indicating, by the WLAN device, a new specified channel using the WUR beacon frame.

With reference to any one of the third aspect, or the first implementation to the eighth implementation of the third aspect, in a ninth implementation of the third aspect, a WLAN band of the specified channel is the same as a WLAN band of the operating channel.

According to a fourth aspect, an apparatus for waking up a terminal device is provided. The apparatus has functions of implementing the behavior of the WLAN device in the method in the third aspect. The functions may be implemented by hardware, or may be implemented by hardware by executing corresponding software. The hardware or the software includes one or more modules corresponding to the foregoing functions.

According to a fifth aspect, a WLAN device is provided. The WLAN device includes a processor and a transceiver. The processor is configured to receive and send a radio signal using the transceiver, and perform the steps in the method in the third aspect.

According to a sixth aspect, an embodiment of the present disclosure provides a computer storage medium configured to store a computer software instruction used by the foregoing WLAN device. The computer software instruction includes a program designed for executing the foregoing aspects.

According to a seventh aspect, an embodiment of the present disclosure provides a computer storage medium configured to store a computer software instruction used by the foregoing terminal device. The computer software instruction includes a program designed for executing the foregoing aspects.

DESCRIPTION OF EMBODIMENTS

The following describes the embodiments of the present disclosure with reference to FIG. 1 to FIG. 5.

In an internet of things scenario, many devices need to be powered by batteries. Therefore, it is quite important to prolong lifespans (e.g., battery lifespans) of the devices. Because a WLAN device is highly popularized, if the WLAN device can be used to implement functions required by the internet of things scenario, a threshold for popularizing the internet of things can be reduced.

The WLAN device may enter a sleep mode. However, the WLAN device in the sleep mode also needs to frequently enter an awake state from a sleep state, to receive data of another WLAN device (for example, a wireless access point (AP) or a WLAN device of another type). A longer time in which a device stays in the sleep state contributes to less consumed energy. However, staying in the sleep state for a long time reduces timely performance of data transmission.

To reduce power consumption of the WLAN device as much as possible and meet a requirement for timely performance of data transmission, a dedicated wake-up radio (WUR) radio frequency circuit other than a primary radio frequency (RF) circuit is disposed in the WLAN device in the embodiments of the present disclosure. The WLAN device on which the WUR radio frequency circuit is disposed is referred to as a WUR terminal device or a terminal device. The WUR radio frequency circuit can only receive a radio signal and cannot send a radio signal. The WUR radio frequency circuit is only configured to receive a frame (which may be referred to as a WUR frame such as a WUR beacon frame or a WUR wake-up frame) related to a wake-up operation, and ignores other frames (for example, a data frame). Therefore, power consumption and complexity of the WUR radio frequency circuit are low. Power consumption of the WUR radio frequency circuit that is generated during operating may be less than 100 microwatts (µW). The primary radio frequency circuit and the WUR radio frequency circuit may be separate, or may be integrated into a chip.

When there is no data that is to be transmitted, the terminal device is in a sleep state. When the terminal device is in the sleep state, the primary radio frequency circuit is disconnected for energy saving. When the terminal device is in the sleep state, the WUR radio frequency circuit listens to a wireless medium, to receive a wake-up frame in time. Optionally, the WUR radio frequency circuit may suspend operating for further energy saving. For example, the WUR radio frequency circuit may periodically suspend operating. Further, when the terminal device is in the sleep state, any component except the WUR radio frequency circuit in the entire device may be in a power-off state. If the terminal device includes a volatile memory, the volatile memory may not be in the power-off state when the terminal device is in the sleep state. Alternatively, the terminal device may copy content in the volatile memory to a non-volatile memory before entering the sleep state, and then the terminal device may disable the volatile memory when entering the sleep state.

When the WLAN device needs to send data to a terminal device, or needs to query data of a terminal device, the WLAN device first sends a wake-up frame. After receiving the wake-up frame, a WUR radio frequency circuit of a to-be-woken-up terminal device wakes up a primary radio frequency circuit of the terminal device. In this case, the terminal device is in the awake state. After sending the wake-up frame, the WLAN device sends a WLAN frame. The WLAN frame may be a data frame or a management frame. The data frame may include an indication for sending the data to the terminal device by the WLAN device or querying the data of the terminal device.

In an example in which the WLAN device is a wireless AP, to reduce interference between wireless APs, adjacent wireless APs usually operate on different operating channels. If wireless APs send WUR frames on respective operating channels, adjacent wireless APs send WUR frames on different channels.

After a terminal device moves from a coverage area of an original wireless AP to a coverage area of an adjacent wireless AP, because the terminal device does not know an operating channel of the new wireless AP, the terminal device can only switch to an operating channel of a WUR radio frequency circuit, to attempt to listen to a WUR frame sent by the new wireless AP. WLAN bands include a 900 megahertz (MHz) band, a 2.4 gigahertz (GHz) band, a 3.65 GHz band, a 4.9 GHz band, a 5 GHz band, a 5.9 GHz band, a 60 GHz band, and the like. Quantities of WLAN channels included in different WLAN bands are specified by regulations of each country/region. For example, there are 25 channels with a bandwidth of 20 MHz in the 5 GHz band in the United States. Because the terminal device does not know the operating channel of the new wireless AP, the operating channel of the WUR radio frequency circuit of the terminal device needs to be frequently switched, to find the operating channel of the new wireless AP from the 25 channels. Frequent channel switching increases power consumption of the WUR radio frequency circuit.

If a plurality of wireless APs in one area send WUR frames on a same channel, when the terminal device randomly moves in the area, the WUR radio frequency circuit of the terminal device may listen to the WUR frame sent by the new wireless AP without a need to perform channel switching.

Figure 1:
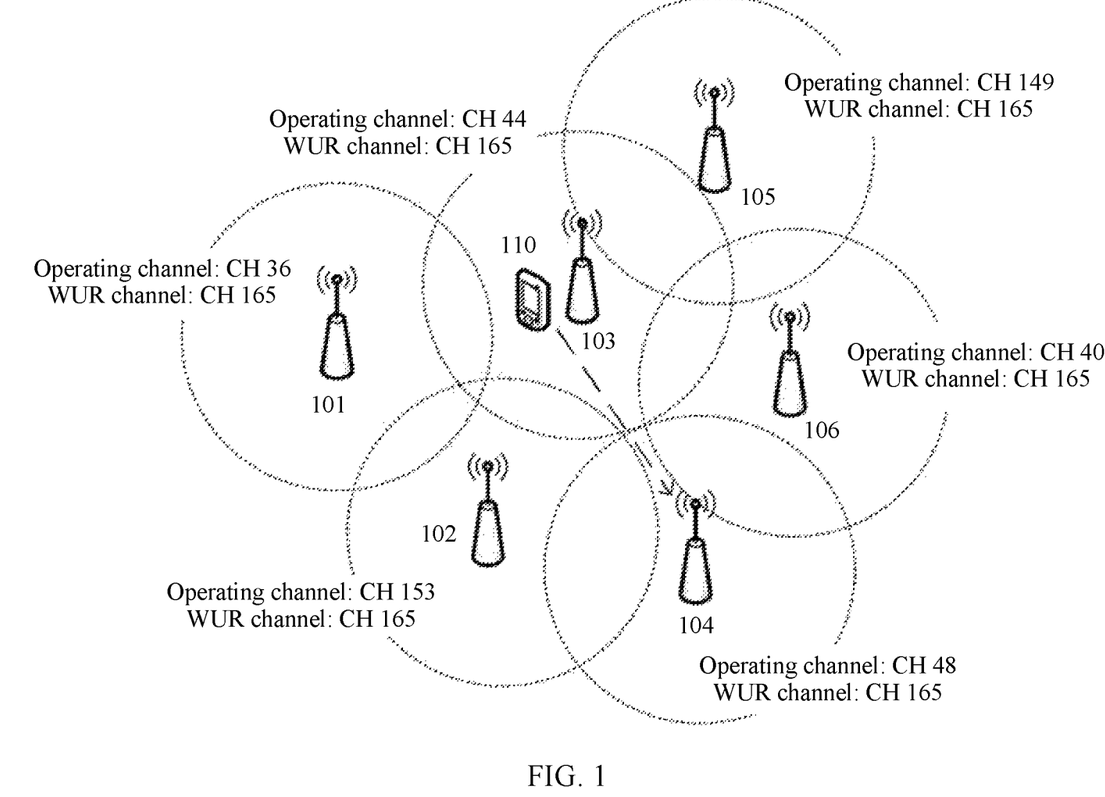
FIG. 1 is a schematic diagram of a network architecture according to an embodiment of the present disclosure.

FIG. 1 is a schematic diagram of a network architecture according to an embodiment of the present disclosure.

In FIG. 1, there are a plurality of wireless devices, namely, a WLAN device 101 to a WLAN device 106.

In this embodiment of the present disclosure, although operating channels of the WLAN device 101 to the WLAN device 106 are different, the WLAN device 101 to the WLAN device 106 send WUR frames on a same specified channel (e.g., a channel (CH) 165). When a terminal device 110 randomly moves in coverage areas of the WLAN device 101 to the WLAN device 106, a WUR radio frequency circuit of the terminal device 110 may listen to a WUR frame sent by any wireless AP without a need to perform channel switching. Alternatively, after any WLAN device fails to send a wake-up frame on an operating channel of the WLAN device, the WLAN device sends the wake-up frame on the specified channel (the channel 165). After the terminal device 110 leaves a coverage area of an original WLAN device, the WUR radio frequency circuit of the terminal device 110 may listen to a WUR frame sent by any wireless AP, provided that the WUR radio frequency circuit of the terminal device 110 is switched to the specified channel.

Figure 2:
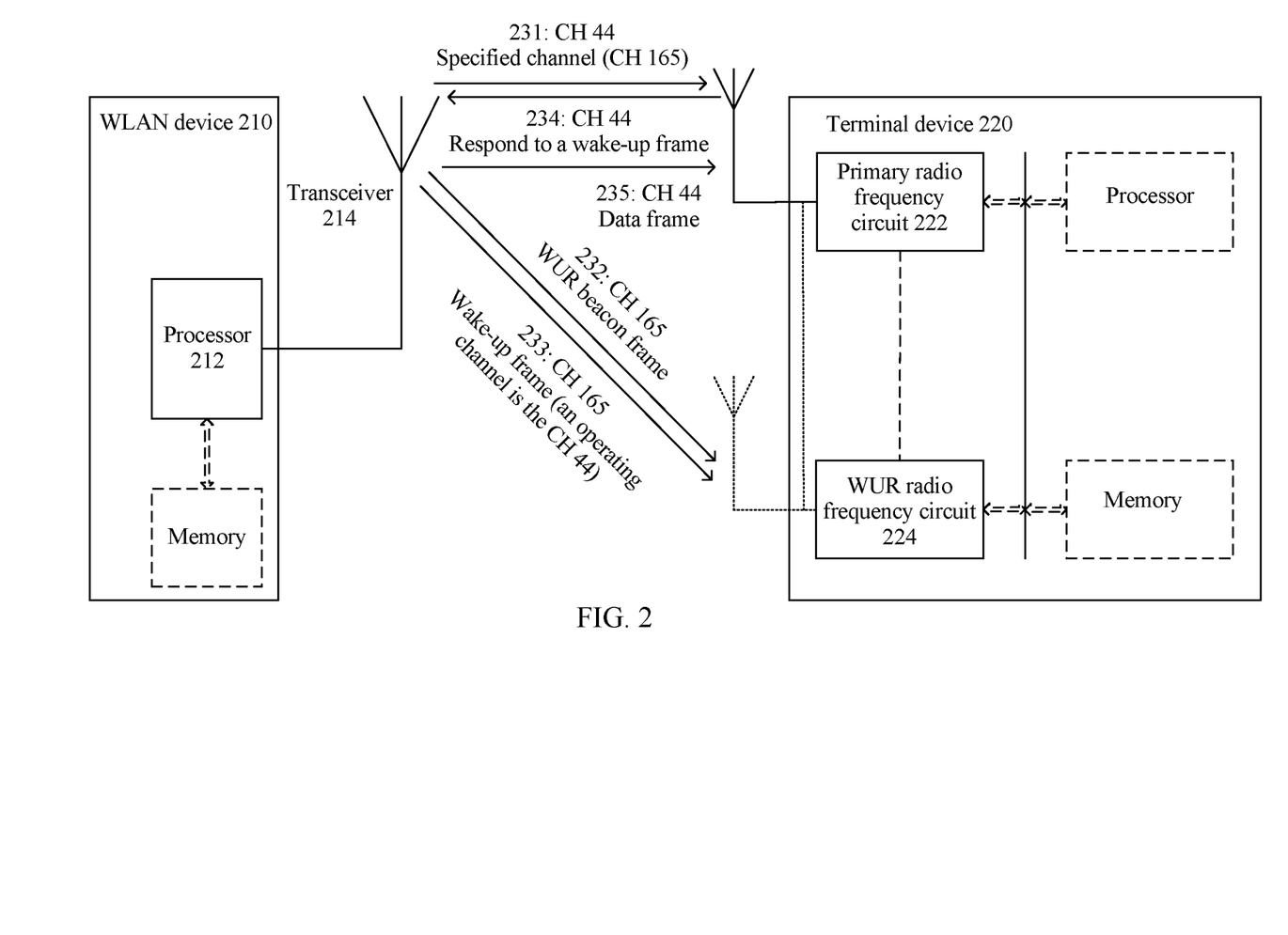
FIG. 2 is a schematic diagram of waking up a terminal device by a WLAN device according to an embodiment of the present disclosure.

FIG. 2 is a schematic diagram of waking up a terminal device by a WLAN device according to an embodiment of the present disclosure.

An example in which a WLAN device 210 wakes up a terminal device 220 is used in FIG. 2, to describe a process in this embodiment of the present disclosure.

The WLAN device 210 includes a processor 212 and a transceiver 214. The processor 212 may include a central processing unit (CPU), a network processor (NP), a radio frequency circuit, an application-specific integrated circuit (ASIC), a programmable logic device (PLD), or any combination thereof. The PLD may be a complex programmable logic device (CPLD), a field-programmable gate array (FPGA), generic array logic (GAL), or any combination thereof. The radio frequency circuit is also referred to as an RF module, and is an electronic component for sending and/or receiving a radio signal between devices. The circuits in the processor may be separate, or may be integrated into one or more chips.

The transceiver 214 may be an antenna. The antenna may include an array antenna, a multi-band antenna, a microstrip antenna, a directional antenna, or any antenna of another type. The processor 212 receives and sends a radio signal using the transceiver 214.

Optionally, the WLAN device 210 further includes a memory. The memory may be a separate device, or may be integrated into the processor 212. The memory may include a volatile memory such as a random-access memory (RAM). The memory may alternatively include a non-volatile memory such as a read-only memory (ROM), a flash memory, an optical disc, a magnetic tape, a floppy disk, a hard disk, or a solid-state drive. The memory may alternatively include any combination of the foregoing types of memories. If the processor 212 needs program code, the memory may store program code and transmit the program code to the processor 212, such that the processor 212 implements this embodiment of the present disclosure according to an indication of the program code.

The terminal device 220 includes a primary radio frequency circuit 222 and a WUR radio frequency circuit 224. There may be one or more primary radio frequency circuits 222. There may be one or more WUR radio frequency circuits 224. For example, an operating band of the primary radio frequency circuit 222 is the same as an operating band of the WUR radio frequency circuit 224. If the terminal device 220 includes a plurality of primary radio frequency circuits 222 with different operating bands, the terminal device 220 may include a plurality of WUR radio frequency circuits 224 with corresponding operating bands. For another example, two or more primary radio frequency circuits 222 with different operating bands may be woken up by one WUR radio frequency circuit 224. The primary radio frequency circuit 222 and the WUR radio frequency circuit 224 may share an antenna. The primary radio frequency circuit 222 and the WUR radio frequency circuit 224 may alternatively use respective antennas. The following describes this embodiment of the present disclosure using a 5 GHz band as an example. This embodiment of the present disclosure may also be applied to another band.

The primary radio frequency circuit 222 is a radio frequency circuit of the terminal device 220 for receiving and sending WLAN data. An operating channel of the primary radio frequency circuit 222 may be referred to as a primary connectivity radio channel.

The WUR radio frequency circuit 224 is a radio frequency circuit of the terminal device 220 for receiving a WUR frame. The WUR radio frequency circuit 224 includes only a receiver and does not include a transmitter. Therefore, the WUR radio frequency circuit can only receive a radio signal and cannot send a radio signal. An operating channel of the WUR radio frequency circuit 224 may be referred to as a WUR channel. The WUR radio frequency circuit 224 uses a specified channel as the WUR channel. Alternatively, the WUR channel includes a primary WUR channel and a secondary WUR channel. The primary WUR channel is the operating channel of the primary radio frequency circuit 222, and the secondary WUR channel is the specified channel. If the WLAN device 210 fails to send a wake-up frame on the primary WUR channel, the WLAN device 210 switches to the secondary WUR channel, to send the wake-up frame. If the terminal device 220 listens and obtains no WUR beacon frame on the primary WUR channel for a long time, the terminal device 220 switches to the secondary WUR channel, to listen to a wireless medium. The specified channel is a same channel on which a plurality of APs send WUR frames.

Optionally, the terminal device 220 may further include a processor. The processor may include a CPU, an NP, an ASIC, a PLD, or any combination thereof. Optionally, the terminal device 220 may further include a memory. The memory may include a volatile memory such as a RAM. The memory may alternatively include a non-volatile memory such as a ROM, a flash memory, an optical disc, a magnetic tape, a floppy disk, a hard disk, or a solid-state drive. The memory may alternatively include any combination of the foregoing types of memories. The primary radio frequency circuit 222, the WUR radio frequency circuit 224, the processor (if any), and the memory (if any) may be separate chips, or may be integrated into one or more chips.

A process of waking up the terminal device 220 by the WLAN device 210 is as follows.

231. The WLAN device 210 sends information about a specified channel on an operating channel of the WLAN device 210, and after receiving the information about the specified channel, a primary radio frequency circuit of the terminal device 220 configures a specified channel of a WUR radio frequency circuit based on the information.

For example, the WLAN device 210 is the WLAN device 103 in FIG. 1, and the terminal device 220 is the terminal device 110 in FIG. 1. The operating channel of the WLAN device 210 is a channel 44, and the specified channel of the WLAN device 210 is a channel 165. The specified channel of the WLAN device 210 may be fixed. For example, the specified channel may be specified by a standard or a regulation, or may be specified by a device vendor. The specified channel of the WLAN device 210 may alternatively be statically configured. For example, the specified channel may be manually configured as a specified value. The specified channel of the WLAN device 210 may alternatively be dynamically negotiated. For example, a plurality of WLAN devices 210 in an area negotiate a specified channel shared by the WLAN devices 210.

If the terminal device 220 knows the specified channel, step 231 may be omitted. Therefore, if the specified channel is fixed or statically configured, step 231 is optional. For example, if the specified channel specified by the standard or the regulation is fixed for the terminal device 220, or if specified channels are manually configured for both the WLAN device 210 and the terminal device 220, step 231 may be omitted.

If the specified channel is fixed or statically configured, a channel on which dynamic frequency selection (DFS) does not need to be performed may be selected as the specified channel. For example, in the United States, Canada, Russia, Singapore, China, South Korea, Australia, Brazil, Taiwan, and New Zealand, one of a channel 149, a channel 153, a channel 157, a channel 161, or a channel 165 may be used as the specified channel.

If the specified channel of the WLAN device 210 is dynamically negotiated, the WLAN device 210 may preferably select a channel on which DFS does not need to be performed as the specified channel. For example, priorities of channels selected as specified channels may be configured in the WLAN devices 210, and a priority of a channel on which DFS does not need to be performed is higher than a priority of another channel.

As specified in regulations of some countries/regions, DFS needs to be performed on all channels in the 5 GHz band, or all channels in the 5 GHz band can be only used indoors. If a WLAN is only used indoors, for example, in an indoor internet of things scenario, the specified channel of the WLAN device 210 may be manually configured as an indoor channel. If a WLAN needs to be used outdoors, the WLAN device 210 performs DFS and then selects a valid WLAN channel as the specified channel.

If the specified channel of the WLAN device 210 is dynamically negotiated, or if the specified channel is fixed or statically configured, but the terminal device 220 does not know the specified channel, the WLAN device 210 needs to notify the terminal device 220 of the specified channel. The WLAN device 210 sends the information about the specified channel on the operating channel. The information about the specified channel may be carried in a WUR channel element. The WUR channel element is a newly defined information element. A value of an element ID field of the WUR channel element is, for example, one of 143 to 173 or 175 to 220. A length of an information field of the WUR channel element may be an octet, and the information field of the WUR channel element includes a channel number. For example, if the specified channel is the channel 165, a value of the channel number of the WUR channel element is 165. The WUR channel element may be carried in one or more of a beacon frame, a probe response frame, or an action frame (for example, a spectrum management action frame or a WUR action frame).

The specified channel may be the same as or different from the operating channel of the WLAN device 210. For example, if the specified channel is the channel 165, and operating channels of a plurality of WLAN devices are respectively the channel 149, the channel 153, the channel 157, the channel 161, and the channel 165, an operating channel of one of the WLAN devices is the same as the specified channel.

Optionally, to reduce interference between the operating channel and the specified channel, an operating channel available to the WLAN device and the primary radio frequency circuit may be configured as a WLAN channel other than the specified channel. For example, if the specified channel is the channel 165, the operating channel available to the WLAN device and the primary radio frequency circuit may be only a valid operating channel other than the channel 165.

If the specified channel is different from the operating channel of the WLAN device 210, the WLAN device 210 switches to the specified channel when being to send a WUR frame, and sends the WUR frame on the specified channel. After sending the WUR frame, the WLAN device 210 returns to the operating channel of the WLAN device 210.

232. The WLAN device 210 sends a WUR beacon frame on the specified channel.

The WLAN device 210 periodically sends the WUR beacon frame on the specified channel (for example, the channel 165). The WUR beacon frame is different from a beacon frame sent by the WLAN device 210 on the operating channel (for example, the channel 44), and the WUR beacon frame and the beacon frame on the operating channel are separately sent. For example, a beacon interval of the WUR beacon frame may be far greater than a beacon interval of the beacon frame. The beacon interval of the WUR beacon frame may be carried in a WUR mode element. The WUR mode element may be carried in one or more of a beacon frame, a probe response frame, or an action frame (for example, a WUR action frame) on the operating channel.

If the WLAN device 210 sends the WUR beacon frame on the specified channel, and the WUR radio frequency circuit 224 of the terminal device 220 is enabled and operates on the specified channel, the terminal device 220 receives the WUR beacon frame. The terminal device 220 that receives the WUR beacon frame knows existence of the WLAN device 210 that sends the WUR beacon frame. Optionally, the WUR beacon frame may include an indication for the operating channel of the WLAN device 210.

The foregoing step 232 is optional, and the WLAN device 210 may not send the WUR beacon frame on the specified channel. For example, if the primary WUR channel is the operating channel and the secondary WUR channel is the specified channel, the WLAN device 210 may only send the WUR beacon frame on the operating channel, and does not send the WUR beacon frame on the specified channel.

When the terminal device 220 is in a sleep state, the WUR radio frequency circuit 224 of the terminal device 220 is enabled. Optionally, when the terminal device 220 is in an awake state, the terminal device 220 may disconnect the WUR radio frequency circuit 224 for further energy saving.

The WLAN device 210 may change the specified channel. For example, if the specified channel of the WLAN device 210 is dynamically negotiated, the WLAN device 210 may change the specified channel. Alternatively, if the specified channel of the WLAN device 210 is configured, the specified channel may be changed in a new configuration. To enable the terminal device 220 to know a change of the specified channel, the WLAN device 210 needs to notify the terminal device 220 of a new specified channel. For example, before changing the specified channel, the WLAN device 210 indicates a new specified channel using the WUR beacon frame. The WUR radio frequency circuit 224 receives the WUR beacon frame, and if the WUR beacon frame indicates a new specified channel, the WUR radio frequency circuit 224 operates on the new specified channel. For another example, if the secondary WUR channel is the specified channel, the WLAN device 210 sends a change indication of the specified channel on the specified channel, to indicate a new specified channel. The WUR radio frequency circuit 224 that operates on the specified channel receives the change indication of the specified channel, and the WUR radio frequency circuit 224 operates on the new specified channel according to the indication. The change indication of the specified channel may be a WUR frame of a new type.

233. The WLAN device 210 sends a wake-up frame on the specified channel.

If the WLAN device 210 needs to wake up one or more terminal devices, the WLAN device 210 sends the wake-up frame on the specified channel. The wake-up frame in this embodiment of the present disclosure is a WUR frame, and may also be referred to as a WUR wake-up frame. The wake-up frame includes an identifier of a to-be-woken-up terminal device. The WUR radio frequency circuit 224 of the terminal device 220 receives the wake-up frame, and may determine, based on the identifier of the to-be-woken-up terminal device, whether the terminal device 220 is the to-be-woken-up terminal device. An identifier of the terminal device may be an address of the terminal device, for example, a media access control (MAC) address, or may be an identifier of another type that can identify the terminal device, for example, an association ID (AID) of the terminal device 220 and a combination of BSS colors of a basic service set (BSS) associated with the terminal device 220. A BSS color is an identifier for simplifying each BBS by the wireless AP in the area. The identifier of the terminal device may be an identifier of one terminal device, or may be a group identifier or a broadcast identifier. The group identifier indicates that all terminal devices in a corresponding group are to-be-woken-up terminal devices. The broadcast identifier indicates that any terminal device is a to-be-woken-up terminal device.

If the WLAN device 210 needs to send a WLAN frame (for example, an individually addressed frame) to one terminal device, the WLAN device 210 sends the wake-up frame indicating that the identifier of the to-be-woken-up terminal device is an identifier of one terminal device, to wake up the terminal device.

If the WLAN device 210 needs to send a WLAN frame to a plurality of terminal devices, the WLAN frame is a group addressed frame. The WLAN device 210 sends the wake-up frame indicating that the identifier of the to-be-woken-up terminal device is a group identifier or a broadcast identifier, to wake up the plurality of terminal devices. The WLAN device 210 sends the group addressed frame on the operating channel after a preparation period after the wake-up frame indicating that the identifier is a group identifier or a broadcast identifier is sent.

The WLAN device 210 may modulate a payload of the WUR wake-up frame through on-off keying (OOK). Correspondingly, the WUR radio frequency circuit 224 demodulates the payload of the WUR wake-up frame through OOK. The WUR wake-up frame may not occupy full bandwidth of the specified channel, but only uses one or more orthogonal frequency division multiplexing (OFDM) subcarriers thereof.

If the WUR radio frequency circuit 224 receives the wake-up frame on the specified channel and the terminal device 220 is the to-be-woken-up terminal device, the WUR radio frequency circuit 224 wakes up the primary radio frequency circuit 222. For example, if the identifier of the to-be-woken-up terminal device is an identifier of one terminal device, and the identifier of the terminal device is the identifier of the terminal device 220, the WUR radio frequency circuit 224 wakes up the primary radio frequency circuit 222. If the identifier of the to-be-woken-up terminal device is a group identifier, and the terminal device 220 is in a group identified by the group identifier, the WUR radio frequency circuit 224 wakes up the primary radio frequency circuit 222. If the identifier of the to-be-woken-up terminal device is a broadcast identifier, the WUR radio frequency circuit 224 wakes up the primary radio frequency circuit 222.

The WUR radio frequency circuit 224 may directly wake up the primary radio frequency circuit 222. Alternatively, the WUR radio frequency circuit 224 may instruct the processor to wake up the primary radio frequency circuit 222. After being woken up, the primary radio frequency circuit operates on an operating channel available to the primary radio frequency circuit.

Optionally, the wake-up frame may include the indication for the operating channel of the WLAN device 210. The primary radio frequency circuit 222 operates on the operating channel according to the indication after being woken up.

234. The primary radio frequency circuit 222 sends a response to the wake-up frame on the operating channel.

If the WLAN device 210 sends the wake-up frame indicating that the identifier of the to-be-woken-up terminal device is the identifier of one terminal device 220, to wake up the terminal device 220 individually, the WLAN device 210 needs to determine whether the terminal device 220 has been woken up. Because the WUR radio frequency circuit 224 cannot send a radio signal, the WUR radio frequency circuit 224 cannot reply with an acknowledgment (ACK) frame on the specified channel. Therefore, the primary radio frequency circuit 222 of the terminal device 220 sends the response to the wake-up frame on the operating channel after being woken up. The response may be an ACK frame, a probe request frame, a data frame (for example, an empty data frame), or any frame of another type, provided that the WLAN device 210 knows that the terminal device 220 has been woken up. If the WLAN device 210 receives the response to the wake-up frame on the operating channel, the WLAN device 210 knows that the terminal device 220 has been successfully woken up. If the WLAN device 210 does not receive the response to the wake-up frame on the operating channel, it indicates that the WLAN device 210 fails to wake up the terminal device 220.

Optionally, if the WLAN device 210 does not receive the response to the wake-up frame on the operating channel, the WLAN device 210 notifies another WLAN device. The other WLAN device and the WLAN device 210 send a new wake-up frame on the specified channel. The new wake-up frame includes the identifier of the terminal device 220. In addition, a new wake-up frame sent by each WLAN device includes an indication for an operating channel of the corresponding WLAN device.

Optionally, if the WLAN device 210 does not receive the response to the wake-up frame on the operating channel, the WLAN device 210 sends a new wake-up frame on the specified channel. The new wake-up frame may be the same as a previously sent wake-up frame. Alternatively, the new wake-up frame may be different from a previously sent wake-up frame. For example, if the operating channel of the WLAN device 210 changes when the WLAN device 210 waits for a response to the previously sent wake-up frame, an indication for the operating channel in the new wake-up frame correspondingly changes.

Optionally, if the WLAN device 210 fails to wake up the terminal device 220 for the first time, the WLAN device 210 attempts to wake up the terminal device 220 again. If the WLAN device 210 fails to wake up the terminal device 220 again after one or more attempts, the WLAN device 210 instructs another WLAN device to send a wake-up frame.

If the WLAN device 210 sends the wake-up frame indicating that the identifier of the to-be-woken-up terminal device is a group identifier or a broadcast identifier, step 234 may be omitted.

235. The WLAN device 210 sends a WLAN frame on the operating channel.

If the WLAN device 210 wakes up the terminal device 220 individually, the WLAN device 210 sends the WLAN frame to the terminal device 220 on the operating channel after determining that the terminal device 220 has been woken up. If the WLAN device 210 sends the wake-up frame indicating that the identifier is a group identifier or a broadcast identifier, to wake up a plurality of terminal devices, the WLAN device 210 does not need to determine whether each WLAN device 220 has been woken up. The WLAN device 210 sends the WLAN frame such as a group addressed frame on the operating channel after a preparation period after the wake-up frame is sent.

Figure 3:
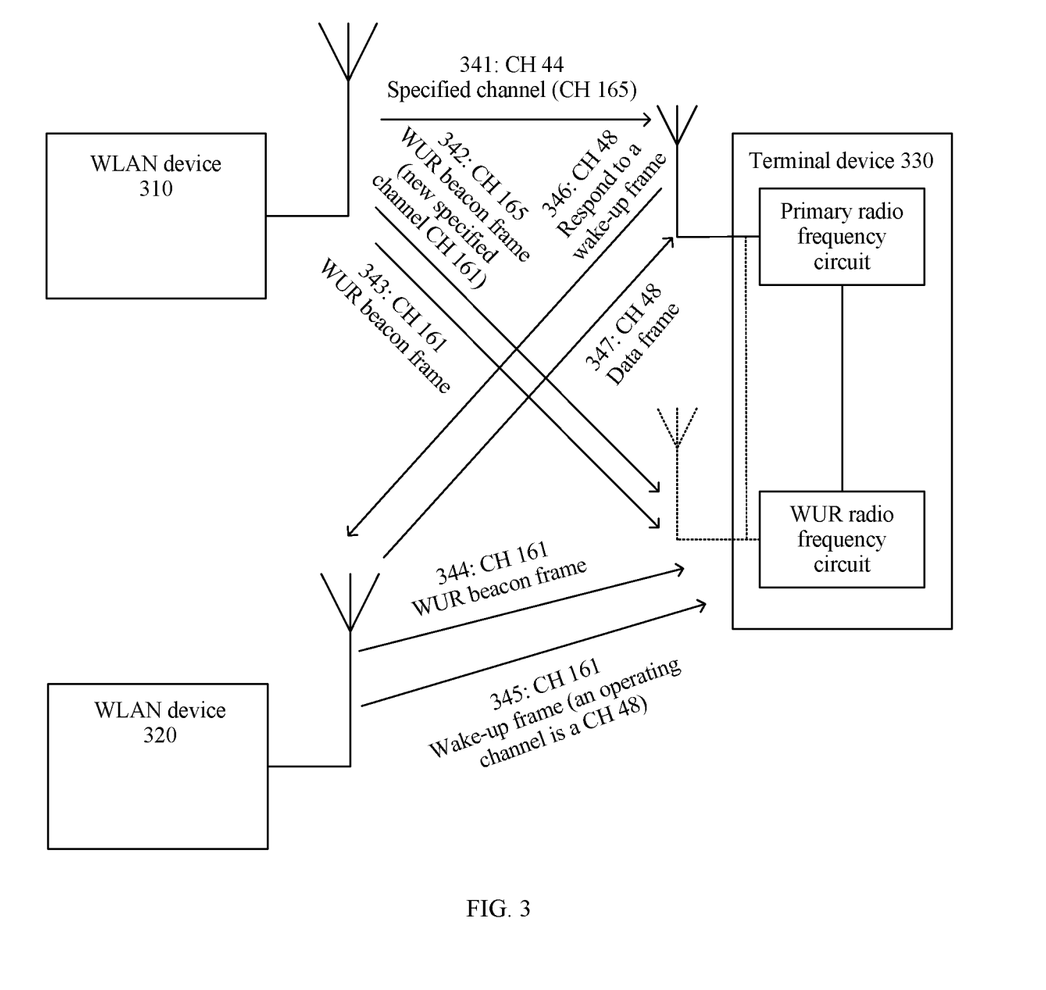
FIG. 3 is an example in which a terminal device moves in coverage areas of two WLAN devices according to an embodiment of the present disclosure.

FIG. 3 is an example in which a terminal device moves in coverage areas of two WLAN devices according to an embodiment of the present disclosure. In FIG. 3, a terminal device 330 is associated with a WLAN device 310 and then enters a sleep state. The terminal device 330 in the sleep state moves into a coverage area of a WLAN device 320 and then is woken up by the WLAN device 320. For example, the WLAN device 310 is the WLAN device 103 in FIG. 1, the WLAN device 320 is the WLAN device 104 in FIG. 1, and the terminal device 330 is the terminal device 110 in FIG. 1. An operation process is as follows.

341. The WLAN device 310 sends information about a specified channel on an operating channel of the WLAN device 310, and after receiving the information about the specified channel, a primary radio frequency circuit of the terminal device 330 configures a WUR channel of a WUR radio frequency circuit as a specified channel based on the information.

The operating channel of the WLAN device 310 is a channel 44, and the specified channel is a channel 165. The WLAN device 310 sends information about the channel 165 on the channel 44. After receiving the information about the channel 165, the primary radio frequency circuit of the terminal device 330 configures the specified channel of the WUR radio frequency circuit as the channel 165. Then, the terminal device 330 enters the sleep state.

342. The WLAN device 310 sends a WUR beacon frame on the specified channel, where the WUR beacon frame indicates a new specified channel.

The WLAN device 310 periodically sends the WUR beacon frame on the channel 165. If the WLAN device 310 determines that the new specified channel is a channel 161, the WUR beacon frame sent by the WLAN device 310 on the channel 165 indicates that the channel 161 is the new specified channel. The WUR radio frequency circuit of the terminal device 330 receives the WUR beacon frame, and configures the new specified channel.

343. The WLAN device 310 sends the WUR beacon frame on the new specified channel.

The WLAN device 310 periodically sends the WUR beacon frame on the channel 161. The terminal device 330 in the sleep state can receive the WUR beacon frame when being in a coverage area of the WLAN device 310. If leaving the coverage area of the WLAN device 310, the terminal device 330 in the sleep state cannot receive the WUR beacon frame.

344. The WLAN device 320 sends a WUR beacon frame on the new specified channel.

The specified channel of the WLAN device 310 is the same as that of the WLAN device 320. When the WLAN device 310 changes the specified channel to the channel 161, the specified channel of the WLAN device 320 is also changed to the channel 161. After the specified channel is changed, the WLAN device 320 periodically sends the WUR beacon frame on the channel 161. The terminal device 330 in the sleep state can receive the WUR beacon frame after entering the coverage area of the WLAN device 320.

345. The WLAN device 320 sends a wake-up frame on the new specified channel.

When the WLAN device 320 needs to wake up the terminal device 330, the WLAN device 320 sends, on the channel 161, a wake-up frame that includes an identifier of the terminal device 330. The wake-up frame further includes an indication for an operating channel (a channel 48) of the WLAN device 320. The WUR radio frequency circuit of the terminal device 330 receives the wake-up frame.

346. The primary radio frequency circuit of the terminal device 330 sends a response to the wake-up frame on an operating channel.

After receiving the wake-up frame, the WUR radio frequency circuit of the terminal device 330 wakes up the primary radio frequency circuit. Because the WUR radio frequency circuit cannot send a radio signal, the WUR radio frequency circuit cannot reply with an acknowledgment frame on the channel 161. Therefore, after being woken up, the primary radio frequency circuit of the terminal device 330 sends the response to the wake-up frame on the channel 48.

If the WLAN device 320 does not receive the response to the wake-up frame on the channel 48, the WLAN device 320 sends a new wake-up frame on the channel 161. The new wake-up frame may be the same as a previously sent wake-up frame. Alternatively, the new wake-up frame may be different from a previously sent wake-up frame.

347. After determining that the terminal device 330 has been woken up, the WLAN device 320 sends a WLAN frame to the terminal device 330 on a channel 48.

Figure 4:
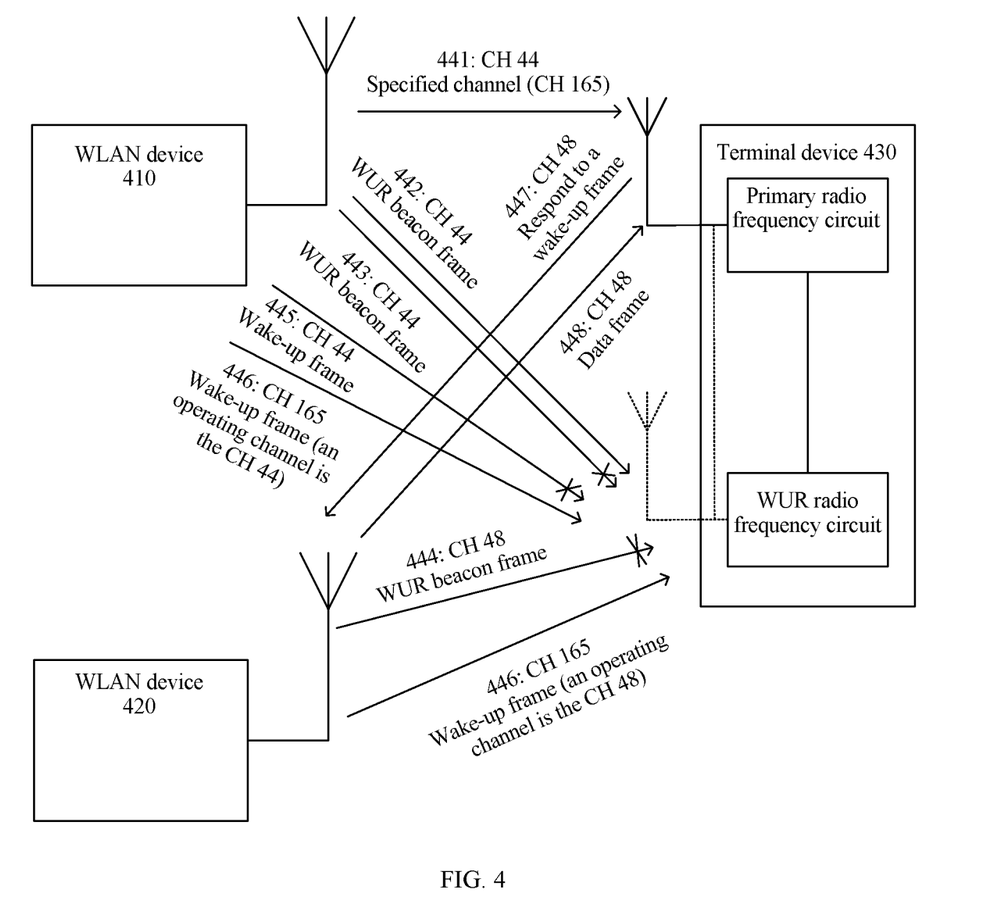
FIG. 4 is another example in which a terminal device moves in coverage areas of two WLAN devices according to an embodiment of the present disclosure.

FIG. 4 is another example in which a terminal device moves in coverage areas of two WLAN devices according to an embodiment of the present disclosure. In FIG. 4, a terminal device 430 is associated with a WLAN device 410 and then enters a sleep state. The terminal device 430 in the sleep state moves into a coverage area of a WLAN device 420 and then is woken up by the WLAN device 420. For example, the WLAN device 410 is the WLAN device 103 in FIG. 1, the WLAN device 420 is the WLAN device 104 in FIG. 1, and the terminal device 430 is the terminal device 110 in FIG. 1. An operation process is as follows.

441. The WLAN device 410 sends information about a specified channel on an operating channel of the WLAN device 410, and after receiving the information about the specified channel, a primary radio frequency circuit of the terminal device 430 configures a specified channel of a WUR radio frequency circuit based on the information.

The operating channel of the WLAN device 410 is a channel 44, and the specified channel is a channel 165. The WLAN device 410 sends information about the channel 165 on the channel 44. After receiving the information about the channel 165, the primary radio frequency circuit of the terminal device 430 configures a secondary WUR channel of the WUR radio frequency circuit as the specified channel (the channel 165). Then, the terminal device 430 enters the sleep state.

442. The WLAN device 410 sends a WUR beacon frame on the operating channel.

The WLAN device 410 periodically sends the WUR beacon frame on the channel 44. If the WLAN device 410 determines a new specified channel, the WUR beacon frame sent by the WLAN device 410 on the channel 44 indicates the new specified channel. The WUR radio frequency circuit of the terminal device 430 receives the WUR beacon frame, and configures the secondary WUR channel as the new specified channel.

443. The terminal device 430 in the sleep state leaves a coverage area of the WLAN device 410, and cannot receive the WUR beacon frame sent by the WLAN device 410 on the operating channel.

The terminal device 430 in the sleep state can receive the WUR beacon frame when being in the coverage area of the WLAN device 410. If leaving the coverage area of the WLAN device 410, the terminal device 430 in the sleep state cannot receive the WUR beacon frame on the channel 44.

444. The WLAN device 420 sends a WUR beacon frame on an operating channel.

The operating channel of the WLAN device 420 is a channel 48. The terminal device 430 in the sleep state cannot know an operating channel of a WLAN device falling in a coverage area of the terminal device 430. The WUR radio frequency circuit of the terminal device 430 in the sleep state still operates on the channel 44, and therefore cannot receive the WUR beacon frame on the channel 48. If the terminal device 430 still fails to listen and obtain the WUR beacon frame after one or more beacon intervals of the WUR beacon frame, the WUR radio frequency circuit operates on the secondary WUR channel, namely, the channel 165.

445. The WLAN device 410 sends a wake-up frame on the operating channel.

When the WLAN device 410 needs to wake up the terminal device 430, the WLAN device 410 sends, on the channel 44, a wake-up frame that includes an identifier of the terminal device 430. Because the terminal device 430 leaves the coverage area of the WLAN device 410, and the WUR radio frequency circuit of the terminal device 430 operates on the secondary WUR channel, namely, the channel 165, the terminal device 430 cannot receive the wake-up frame from the WLAN device 410.

446. The WLAN device 410 instructs each WLAN device to send a wake-up frame on a specified channel.

Because the terminal device 430 is not woken up, and therefore does not respond to the wake-up frame, the WLAN device 410 receives no response to the wake-up frame on the channel 44. Optionally, the WLAN device 410 may send a new wake-up frame on the channel 44. If the WLAN device 410 fails to send the wake-up frame for the first time, or fails to resend the wake-up frame, the WLAN device 410 instructs each WLAN device (including the WLAN device 420) to send, on the specified channel (the channel 165), the wake-up frame that includes the identifier of the terminal device 430. In addition, each wake-up frame includes an indication for an operating channel of a corresponding WLAN device. The WUR radio frequency circuit of the terminal device 430 operates on the secondary WUR channel, namely, the channel 165. Therefore, the terminal device 430 receives the wake-up frame from the WLAN device 420. The wake-up frame from the WLAN device 420 includes an indication for the operating channel (the channel 48) of the WLAN device 420.

447. The primary radio frequency circuit of the terminal device 430 sends a response to the wake-up frame on an operating channel (a channel 48) indicated by the wake-up frame.

448. After determining that the terminal device 430 has been woken up, the WLAN device 420 sends a WLAN frame to the terminal device 430 on the channel 48.

Figure 5:
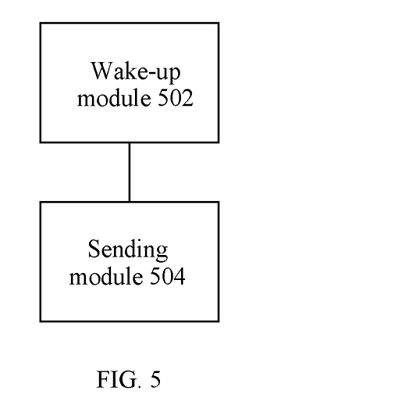
FIG. 5 is a schematic diagram of an apparatus for waking up a terminal device according to an embodiment of the present disclosure.

FIG. 5 is a schematic diagram of an apparatus for waking up a terminal device according to an embodiment of the present disclosure. The apparatus for waking up a terminal device is implemented by any WLAN device in FIG. 1. The apparatus for waking up a terminal device includes a wake-up module 502 and a sending module 504. The wake-up module is configured to send a wake-up frame on a specified channel, and the wake-up frame includes an identifier of a to-be-woken-up terminal device. The sending module is configured to send a WLAN frame on an operating channel. For details about the apparatus for waking up a terminal device, refer to the content of the foregoing embodiments shown in FIG. 1 to FIG. 4.

All or some of the foregoing embodiments may be implemented using software, hardware, or a combination thereof. When the software or the combination of software and hardware is used to implement the embodiments, all or some of the embodiments may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a storage medium or may be transmitted from one storage medium to another storage medium. For example, the computer instructions may be transmitted from one website, computer, server, or data center to another website, computer, server, or data center in a wired (for example, a coaxial cable, a twisted pair, or an optical fiber) or wireless (for example, infrared, radio, or microwave) manner. The storage medium may be any usable medium accessible by a computer, or a data storage device, such as a server or a data center, integrating one or more media. The usable medium may be a magnetic medium (for example, a floppy disk, a hard disk, or a magnetic tape), an optical medium (for example, an optical disc), a semiconductor medium (for example, a solid-state drive (SSD)), or the like.

The foregoing descriptions are merely example embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A terminal device, comprising:
a primary radio frequency circuit configured to:
operate on an operating channel of the primary radio frequency circuit after being woken up; and
receive information about a specified channel on the operating channel of the primary radio frequency circuit; and
a wake-up radio (WUR) radio frequency circuit configured to:
receive only a radio signal;
operate on the specified channel of the WUR radio frequency circuit; and
wake up the primary radio frequency circuit when:
receiving a wake-up frame on the specified channel, wherein the wake-up frame comprises an identifier of the terminal device; and
determining that the terminal device is to be woken up.

2. The terminal device according to claim 1, wherein the identifier of the terminal device comprises a media access control (MAC) address.

3. The terminal device according to claim 1, wherein a second operating channel available to the primary radio frequency circuit is a wireless local area network (WLAN) channel other than the specified channel.

4. The terminal device according to claim 1, wherein the wake-up frame further comprises an indication for the operating channel, and wherein the primary radio frequency circuit is further configured to operate on the operating channel after being woken up.

5. The terminal device according to claim 1, wherein the WUR radio frequency circuit is further configured to:
receive a WUR beacon frame indicating a new specified channel; and
operate on the new specified channel.

6. The terminal device according to claim 1, wherein an operating band of the primary radio frequency circuit is the same as an operating band of the WUR radio frequency circuit.

7. A method for waking up a terminal device, the method comprising:
receiving, by a wake-up radio (WUR) radio frequency circuit of the terminal device, only a radio signal;
operating on a specified channel of the WUR radio frequency circuit;
waking up, by the WUR radio frequency circuit, a primary radio frequency circuit of the terminal device when the WUR radio frequency circuit receives a wake-up frame and the terminal device is a to-be-woken-up terminal device, wherein the wake-up frame comprises an identifier of the to-be-woken-up terminal device;
receiving, by the primary radio frequency circuit, information about the specified channel on an operating channel of the primary radio frequency circuit; and
operating, by the primary radio frequency circuit, on the operating channel of the primary radio frequency circuit after being woken up.

8. The method according to claim 7, wherein the identifier of the terminal device comprises a media access control (MAC) address.

9. The method according to claim 7, wherein a second operating channel available to the primary radio frequency circuit is a wireless local area network (WLAN) channel other than the specified channel.

10. The method according to claim 7, wherein the wake-up frame further comprises an indication for the operating channel, and wherein the method further comprises operating, by the primary radio frequency circuit after being woken up, on the operating channel indicated by the wake-up frame.

11. The method according to claim 7, further comprising:
receiving, by the WUR radio frequency circuit, a WUR beacon frame; and
operating, by the WUR radio frequency circuit, on a new specified channel when the WUR beacon frame indicates the new specified channel.

12. The method according to claim 7, wherein an operating band of the primary radio frequency circuit is the same as an operating band of the WUR radio frequency circuit.

13. A method for waking up a terminal device implemented by a wireless local area network (WLAN) device, the method comprising:
sending information about a specified channel on an operating channel of a primary radio frequency circuit in the terminal device;
sending a wake-up frame on the specified channel, wherein the wake-up frame comprises an identifier of the terminal device; and
sending a WLAN frame on the operating channel of the primary radio frequency circuit in the terminal device.

14. The method according to claim 13, wherein the identifier of the terminal device comprises a media access control (MAC) address.

15. The method according to claim 13, wherein the operating channel is a WLAN channel other than the specified channel.

16. The method according to claim 13, wherein the wake-up frame further comprises indication information for the operating channel.

17. The method according to claim 13, wherein the identifier is a group identifier or a broadcast identifier, wherein the WLAN frame is a group addressed frame, and wherein the method further comprises:
waiting for a preparation period after sending the wake-up frame; and
sending the WLAN frame after waiting for the preparation period.

18. The method according to claim 13, further comprising periodically sending a wake-up radio (WUR) beacon frame on the specified channel, wherein the WUR beacon frame is sent on the specified channel separately from a beacon frame sent on the operating channel.

19. The method according to claim 18, further comprising:
indicating a new specified channel using the WUR beacon frame; and
changing the specified channel to the new specified channel.

20. A wireless local area network (WLAN) device, comprising:
a transceiver; and
a processor coupled to the transceiver and configured to:
send, via the transceiver, information about a specified channel on an operating channel of a terminal device;
send, via the transceiver, a wake-up frame on the specified channel, wherein the wake-up frame comprises an identifier of the terminal device; and
send, via the transceiver, a WLAN frame on the operating channel of the terminal device.

21. The WLAN device according to claim 20, wherein the identifier of the terminal device comprises a media access control (MAC) address.

22. The WLAN device according to claim 20, wherein a second operating channel available to the WLAN device is a WLAN channel other than the specified channel.

23. The WLAN device according to claim 20, wherein the wake-up frame further comprises indication information for the operating channel.

24. The WLAN device according to claim 20, wherein the identifier of the terminal device is a group identifier or a broadcast identifier, wherein the WLAN frame is a group addressed frame, and wherein the processor is configured to send the WLAN frame on the operating channel after expiration of a preparation period that begins after the wake-up frame is sent.

25. The WLAN device according to claim 20, wherein the processor is further configured to periodically send a wake-up radio (WUR) beacon frame on the specified channel, and wherein the WUR beacon frame is sent on the specified channel separately from a beacon frame sent on the operating channel.

26. The WLAN device according to claim 25, wherein the processor is further configured such that before the specified channel is changed, the processor indicates a new specified channel using the WUR beacon frame.

* * * * *